United States Patent
Hsing et al.

(10) Patent No.: US 6,826,726 B2
(45) Date of Patent: Nov. 30, 2004

(54) REMOTE DOCUMENT UPDATING SYSTEM USING XML AND DOM

(75) Inventors: Jeff Hsing, Cambridge, MA (US); Kun-Wei Chou, Allston, MA (US); Isaac Kriegman, Somerville, MA (US); Arvind Goyal, Sudbury, MA (US)

(73) Assignee: Vaultus Mobile Technologies, Inc., Boston, MA (US)

( * ) Notice: Subject to any disclaimer, the term of this patent is extended or adjusted under 35 U.S.C. 154(b) by 643 days.

(21) Appl. No.: 09/932,209

(22) Filed: Aug. 17, 2001

(65) Prior Publication Data

US 2002/0023113 A1 Feb. 21, 2002

Related U.S. Application Data

(60) Provisional application No. 60/226,195, filed on Aug. 18, 2000.

(51) Int. Cl.[7] .............................................. G06F 17/00
(52) U.S. Cl. ....................................... 715/513; 707/201
(58) Field of Search ......................... 715/513; 707/201; 719/318

(56) References Cited

U.S. PATENT DOCUMENTS

| | | | |
|---|---|---|---|
| 6,635,089 B1 * | 10/2003 | Burkett et al. | 715/513 |
| 6,725,281 B1 * | 4/2004 | Zintel et al. | 719/318 |
| 6,745,208 B2 * | 6/2004 | Berg et al. | 707/201 |

* cited by examiner

Primary Examiner—Sanjiv Shah
(74) Attorney, Agent, or Firm—Michael C. Cesarano

(57) ABSTRACT

In a system comprising a local processing device, a transmission link to a remote processing device, and a remote processing device, a method for updating a remote document in accordance with mutations made to a portion of the remote document maintained on the local processing device comprising the steps of loading at least a portion of the remote document into the local processing device as a local XML document, creating a logical document object model (DOM) having a plurality of nodes arranged in a logical hierarchical structure such that each node corresponds to an XML tag and data element in the XML document, mutating the XML document by adding, deleting, or modifying one or more of its data elements, updating the DOM to conform to the mutations to the XML document, creating a first event table that contains events corresponding to each mutation to the XML document where each entry comprises a path to a node in the DOM affected by the mutation and an event type, processing the first event table to create a second event table that contains the smallest number of events necessary to update the remote document to conform to the local XML document, transmitting the second event table and related data from the local device to the remote device, and mutating the remote document in accordance with events in said second event table and related data such that said remote document will have corresponding data elements of the same value as mutated data elements in the modified local XML document.

21 Claims, 11 Drawing Sheets

Local Database

Address Book   [200]

| Name   [210] | Phone   [220] | E-Mail   [230] |
|---|---|---|
| Smith, John | 617-321-7654 | jsmith@thisdomain.com |
| Doe, David | 206-987-6543 | ddoe@thatdomain.com |
| Jones, Sally | 305-678-9012 | sjones@otherdomain.com |

FIG 2a

| XML Document | Reference Numbers |
|---|---|
| `<addressbook>` | [250] |
|     `<person ID = "1">` | [260] |
|         `<name>Smith, John</name>` | [270] |
|         `<phone>617-321-7654</phone>` | [280] |
|         `<email>jsmith@thisdomain.com</email>` | [290] |
|     `</person>` | |
|     `<person ID = "2">` | |
|         `<name>Doe, David</name>` | |
|         `<phone>206-987-6543</phone>` | |
|         `<email>ddoe@thatdomain.com</email>` | |
|     `</person>` | |
|     `<person ID = "3">` | |
|         `<name>Jones, Sally</name>` | |
|         `<phone>305-678-9012</phone>` | |
|         `<email>sjones@otherdomain.com</email>` | |
|     `</person>` | |
| `</addressbook>` | |

FIG. 2b

Changes to Address Book

| Event [340] | Reference | Change [350] | Time [360] |
|---|---|---|---|
| David Doe changes phone number | [370] | 206-987-6543 to 206-987-3456 | 8/17/00 7:03:06 p.m. |
| Sally Jones changes e-mail address | [371] | sjones@otherdomain.com to sallyj@newdomain.com | 8/17/00 7:03:10 p.m. |
| Add Carol Roe | [372] | "Add new name" | 8/17/00 7:03:14 p.m. |
| Change name | [373] | Carol Roe | 8/17/00 7:03:15 p.m. |
| Change phone | [374] | 205-432-1098 | 8/17/00 7:03:20 p.m. |
| Change e-mail | [375] | croe@mydomain.com | 8/17/00 7:03:25 p.m. |
| Remove David Doe | [376] | "Remove name" | 8/17/00 7:03:26 p.m. |
| Carol Roe changes phone number | [377] | 205-432-1098 to 205-432-1100 | 8/18/00 9:51:00 a.m. |

FIG. 3a

Event Table

| XQL Path [310] | Reference | Nature of Event [320] | Time [330] |
|---|---|---|---|
| //person[@ID="2"]/phone | [380] | change | 8/17/00 7:03:06 p.m. |
| //person[@ID="3"]/email | [381] | change | 8/17/00 7:03:10 p.m. |
| //person[@ID="4"] | [382] | add | 8/17/00 7:03:14 p.m. |
| //person[@ID="4"]/name | [383] | add | 8/17/00 7:03:15 p.m. |
| //person[@ID="4"]/phone | [384] | add | 8/17/00 7:03:20 p.m. |
| //person[@ID="4"]/email | [385] | add | 8/17/00 7:03:25 p.m. |
| //person[@ID="2"] | [386] | delete | 8/17/00 7:03:26 p.m. |
| //person[@ID="4"]/phone | [387] | change | 8/18/00 9:51:00 a.m. |

FIG. 3b

SORTED EVENT TABLE:

| Event | Type | Reference | Data |
|---|---|---|---|
| //person[@ID=2"] | DELETE | [386] | |
| //person[@ID=@2A]/phone | MODIFY | [380] | phone=206-987-3456 |
| //person[@ID=@3A]/email | MODIFY | [381] | email="sallyj@newdomain.com" |
| //person[@ID=@4A] | ADD | [382] | person[@ID=@4"] |
| //person[@ID=@4A]/email | ADD | [385] | email="croe@mydomain.com" |
| //person[@ID=@4A]/name | ADD | [383] | name = "Carol Roe" |
| //person[@ID=@4A]/phone | ADD | [384] | phone = "205-432-1098" |
| //person[@ID=@4A]/phone | MODIFY | [387] | phone = "205-432-1100" |

FIG. 4

SAVE LIST

| Event | Type | Reference | Data |
|---|---|---|---|
| //person[@ID="2"] | DELETE | [386] | |
| //person[@ID="3"]/email | MODIFY | [381] | email ="sallyj@newdomain.com" |
| //person[@ID="4"] | ADD | [382] | person[@ID="4"] |
| //person[@ID="4"]/email | ADD | [385] | email ="crow@mydomain.com" |
| //person[@ID="4"]/name | ADD | [383] | name = "Carol Roe" |
| //person[@ID="4"]/phone | ADD | [384, 387] | phone = "205-432-1100" |

FIG. 6

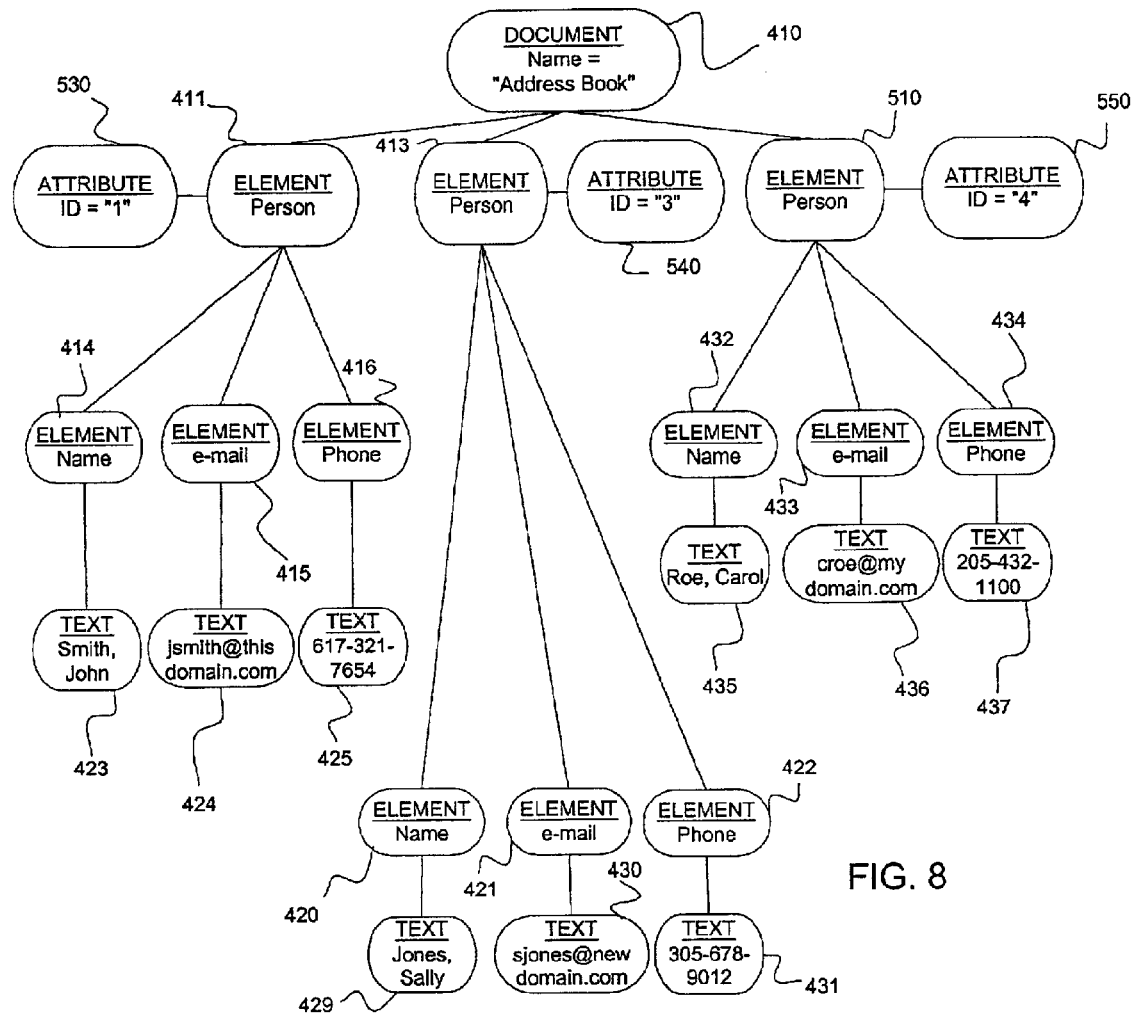
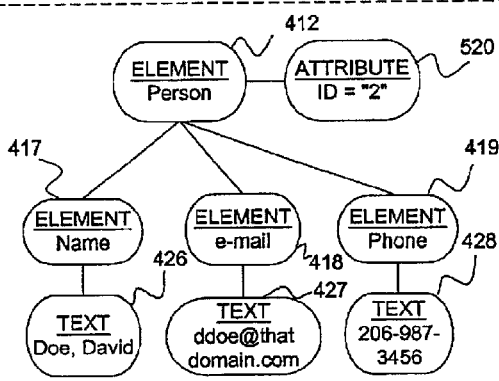
FIG. 8

REMOTE DOCUMENT UPDATING SYSTEM USING XML AND DOM

This application claims the benefit of Provisional Application No. 60/226,195, filed Aug. 18, 2000.

FIELD OF THE INVENTION

This invention relates to a system for updating and synchronizing a document on a network server from a remote device. More specifically, this invention uses the Document Object Model (DOM) specification to manipulate documents, including databases that conform to the XML document structure specification, to enable remote workstations, or clients, to update a database on a server. Because the invention performs the update through the transmission of the minimum amount of information necessary to fully update the server's database, it is suitable for applications, including wireless transmissions, transmissions in which the connection between the client and server is of limited bandwidth, transmissions using conventional telephone lines, and transmissions through computer networks using physical media.

BACKGROUND OF THE INVENTION

In modern business and industrial applications, it is imperative that critical databases be updated and synchronized frequently and regularly to ensure the accuracy of their information. It is common for entire offices and buildings to be devoted to personnel whose primary task is to enter data into a database in the form of additions of new data, deletions of old data, or modifications of existing data. The data is entered from workstations ("clients") that are networked with a server upon which the main database resides. Each change to the data is transmitted to the server, which will temporarily lock the record from access by other users, make and save the change, and then unlock the record so that it may be accessed by other users. This process is repeated countless times during the course of a normal workday, each change requiring essentially the same steps to be taken. When the server and its clients are directly connected over a large bandwidth connection, the overhead that may be inherent in multiple changes being made to the same record may not be detrimental to the overall throughput of the system. However, when the server and its clients must communicate over narrow bandwidth channels, the possibility for congestion to detrimentally affect system performance is significantly greater. The degree of congestion rises with the size of the database, the number of entries needed to keep it current, and the frequency with which accesses to the database are made.

The advent and increasing prevalence of wireless communications has made it possible for databases to be maintained and brought current from remote sites. Using wireless technology, critical databases can be maintained in a near-current state from cellular telephones, hand-held devices, and personal data assistants (PDA's), regardless of where they may be located. Common uses for such technology may be found in the maintenance of personal and business calendars from PDA's that are remote from the server where the organization's entire calendar is maintained, sales automation and inventory management, and similar applications. Uses for such technology could involve a customer's use of a handheld device to register purchases in a supermarket; automated closeout of a car rental upon return of the vehicle without the need for human oversight; or position tracking for vehicles and aircraft based, not upon a radar/transponder reflection, but upon the vehicle's own report of its position from global satellite positioning data. Virtually every database application in which timely and accurate information updating is critical is subject to remote data entry that may rely upon wireless communications.

A primary drawback for such applications is that the bandwidth available for database updates from remote clients may be limited. As wireless devices become more prevalent, the availability of bandwidth for each application and user will diminish, resulting in transmission bottlenecks, communications delays, and ultimately, the untimely update of project-critical information. Since common wireless applications such as cellular telephones and wireless Internet PDAs are commonly assigned narrow bandwidths, there is a need for a system that will reduce the number of accesses from client to server and that will require the transmission of only the smallest amount of data that is necessary to provide complete information for the server to update its database. The concept of sending only the smallest amount of information needed to perform the update is known as "granularity." In general, a finer granularity results in a more efficient the use of the available bandwidth.

SUMMARY OF THE INVENTION

The present invention is a system that resides on the remote client, and which notes and records the accumulation of mutations (additions, deletions, modifications) to the client's local database, which normally will constitute a subset of the main database that resides on the server. Before changes to the local database are transmitted to the server, they are processed and reduced to the smallest amount of data, or the finest granularity, that will allow the server to record the changes to the main database. The system uses XML (extensible Markup Language) documents to represent the local database, and further uses the DOM (Document Object Model) established by the World Wide Web Consortium (W3C), to provide a standardized interface for manipulation of the XML document. Although the specifications for the DOM and the XML are currently undergoing a process of development and refinement, the implementation of those specifications in this invention is not intended to be version-specific, but is generic and should perform effectively with future versions of those specifications as well as with all existing versions.

In XML, a "document" may represent a collection of related data, including a database. In the DOM specification, an XML document may be represented as a logical "tree" having objects, or "nodes," located in a hierarchical branching structure. Each node has various properties, including at least a "name" (or "label") property, and a "data value" property. Each discrete data element in the XML document can be identified by an XML tag, and the DOM will have a node corresponding to each such data element. When data in the XML document is added, deleted, or modified, the DOM also changes to reflect the modification. The automatic modification of the DOM to conform to the XML document is a property of the DOM specification and its implementation. Mutations to the XML document are recorded in an Event Table as "events." All events are stored, cross referenced to the path of the node, a timestamp, and the mutation type. When data synchronization occurs, the Event Table is parsed, and each node at which multiple events took place is collapsed to a single event using a set of rules described below. The data value of such collapsed node is the value left by the last mutation involving the node. By collapsing the number of node events in the DOM after modifications have been made to the document, the data necessary to update the main database is brought to a minimum, and may then be transmitted to the server for application to the main database.

The process of collapsing the number of node events requires a sorting, followed by the parsing of each event in the Event Table whereby events to be passed to the remote database will be saved in a Save Table, while redundant events are discarded. When the Save Table has been created, a synchronization manager will then retrieve data from each node referenced in the Save Table, and the data for each event in the Save Table will be transmitted to the main database along with the node address, an optional date stamp, and the event type.

Accordingly, it is an object of the present invention to provide a system for tracking changes made at a workstation to a subset of a database and, before sending the changes to the server, to reduce to a minimum the amount of a information that must be sent. It is a further object of this invention to increase the efficiency of database updates over narrow bandwidth communication channels. It is another object of the invention to utilize the XML and DOM specifications to process data on a remote client using a standardized format for reducing the amount of information necessary to fully describe the changes to the database. These and other objects of the invention will become evident through the following description of the invention.

BRIEF DESCRIPTION OF THE DRAWINGS

FIG. 2a shows an example in which the local database is an address book.

FIG. 2b shows a logical representation of the address book in the format of an XML document.

FIG. 3a lists hypothetical changes that are made to the address book.

FIG. 3b shows the hypothetical changes to the address book as they are recorded in the Event Table.

FIG. 4 shows the Event Table after it has been sorted and before it has been parsed.

In FIGS. 5a and 5b, the Event Table has been sorted, but has not yet been parsed.

FIG. 6 shows the Save List for mutations made to the hypothetical address book of FIGS. 2–4.

FIG. 8 is the DOM representation of the XML document representing the hypothetical address book after changes have been made to the address book.

DESCRIPTION OF THE PREFERRED EMBODIMENTS

Figure 1:
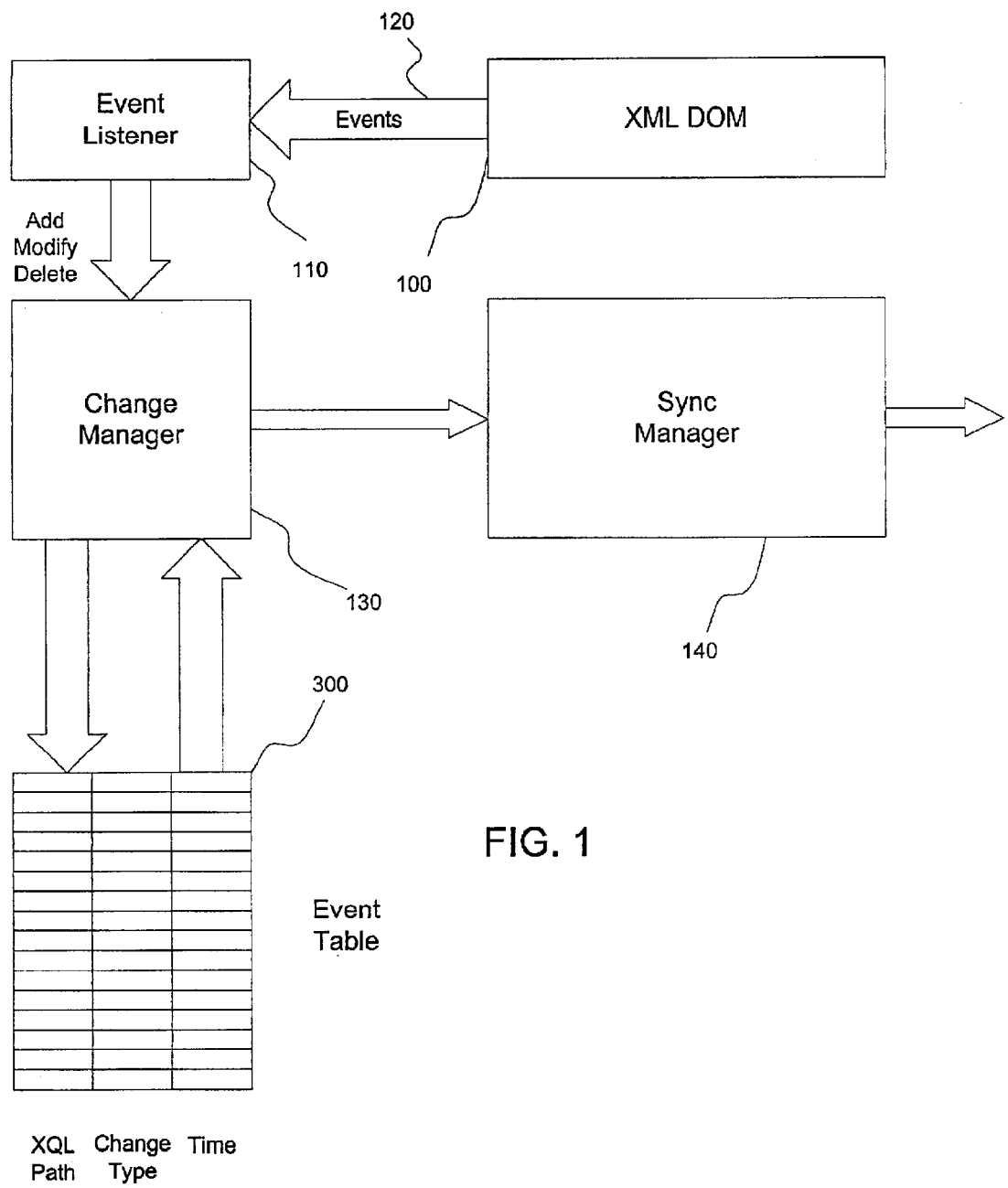
FIG. 1 is a flow chart depicting the flow of events through a remote client prior to transmission to a server for entry into a database.

As is shown in the flow chart of FIG. 1, changes made to a local database 100 are registered as "events" by Event Listener 110. In the XML-DOM specification, as applied in the invention, an event occurs whenever a node is added or deleted, or the data in a field is modified. In FIG. 1, events 120 are detected at Event Listener 110 and passed to Change Manager 130 where they are listed as records in Event Table 300. When modifications to the XML database have been completed, the Change Manager 130 parses Event Table 300 to determine which nodes in the DOM tree are affected by the events listed in the Event Table. The parsing creates a second list of changes (the "Save Table") to be transmitted to the computer on which the main database resides which, when applied to the main database, will update that database with the remotely-performed changes, thus keeping the client and server data in synchronization. This second list represents the smallest number of modifications that must be made to fully update the database resident on the server. The Save Table may be compressed with any commercial compression product for transmission to the server where the database will be modified in accordance with data received from the Synch Manager.

In FIG. 2a, an example is shown using an address book as the local database 200. It will be understood, however, that this invention is not limited to this exemplary implementation, and that any document capable of being formatted as an XML document having a DOM representation, and subject to multiple modifications made from a remote terminal, will fall within the scope of the invention. In this example, the address book may constitute a subset of a larger organization-wide address book maintained on the server. The local address book has three fields: "Name" 210, "Phone" 220, and "E-Mail" 230. Three records are in the address book, and the manner in which the system of this invention updates the organization-wide address book with changes made to the records shown in FIG. 2a will be described.

FIG. 2b shows the address book represented as an XML document. In the XML specification, a "document" may constitute almost any object having properties that include a value. The XML structure reflects the organization of the database. Thus, the XML tag <address book> 250, represents the database, and is located at the highest level. Each database record 260, defined as a "person," is located at an intermediate level, and has a unique ID attribute that uniquely identifies it and distinguishes it from other elements at the same level. Discrete data elements representing the data in each field of each record are located at the lowest level. In FIG. 2b, the XML tag <person ID="1"> 260 is at the intermediate level, while data maintained under the XML tags for <name> 270, <phone> 280, and <email> 290 are located at the lowest level.

Figure 7:
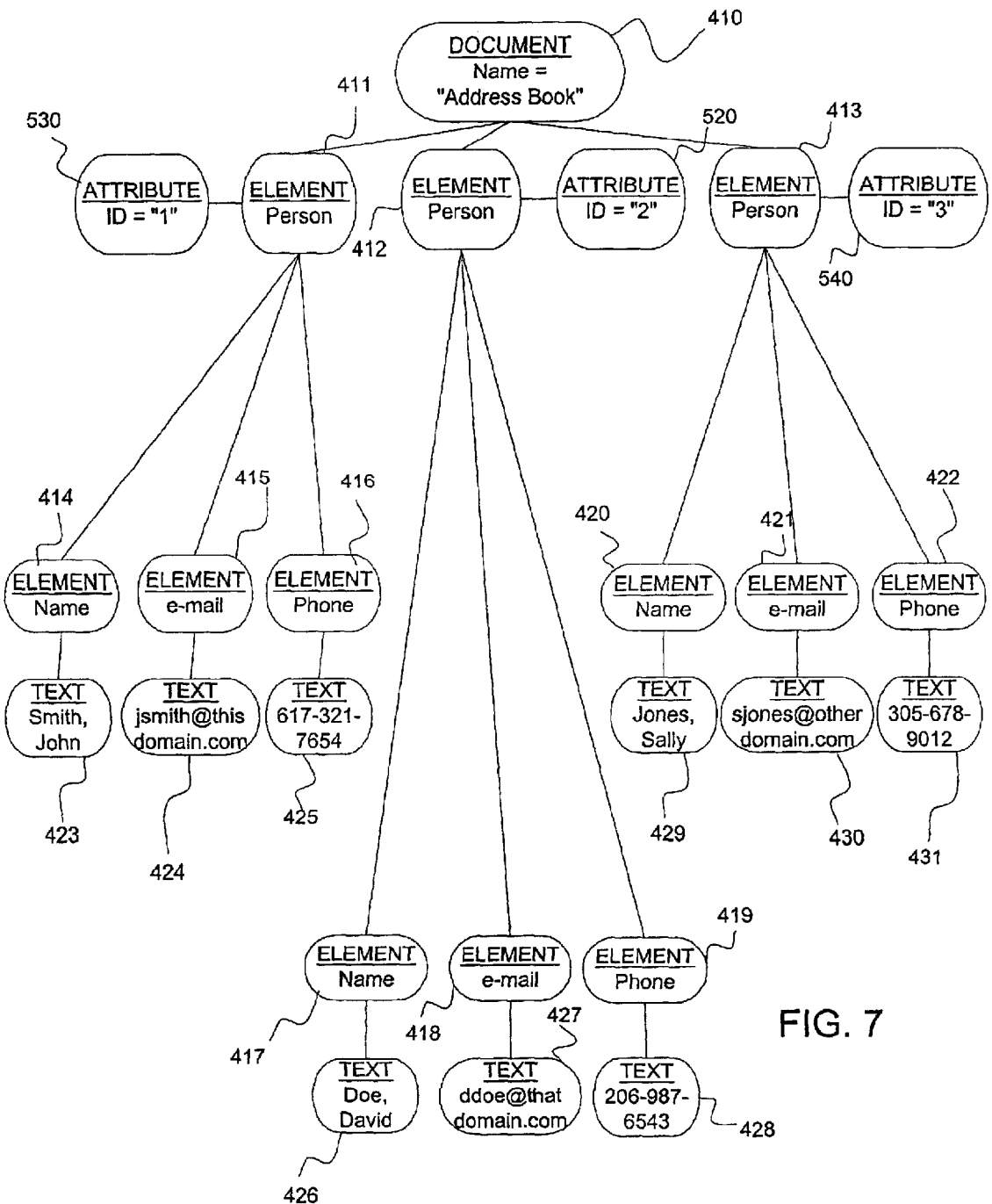
FIG. 7 is a DOM representation of the XML document of FIG. 2b prior to changes having been made.

The DOM presents documents as a hierarchy of "node" objects. The DOM corresponding to the XML document of FIG. 2b is a branching hierarchy, as depicted in FIG. 7. The DOM may include a variety of node objects that also implement other, more specialized interfaces for accessing and manipulating document objects. Some types of nodes may act as "parent" nodes having "child" nodes below them in the hierarchy. Others may be "leaf" nodes that cannot have anything below them in the document structure. Each node in the DOM corresponds to an XML tag. Each node has properties, including at least a "name" property and a data value property. As shown in FIG. 7, node 411 is an "element" type object, and has a name property ("Person") and an ID attribute 530 of "1." The node is a parent-type node established in the DOM specification. Nodes 414-422 with them. However, for each sub branch of the DOM, the element name property for each element will not be repeated in that sub branch. Nodes 422-431 are leaf "text" nodes and cannot have child nodes below them. A text node contains only a data value and is associated with an element node. For example, node 416 is the element node having the property "phone," and node 425 is the associated text containing the data "617-321-7654." Another example is shown at nodes 418 and 427 having the element "email," and a data value of "ddoe@.thatdomain.com."

Mutations are made to the local database by adding, deleting, or substituting data elements in the XML document. Example changes to the address book are shown in tabular form in FIG. 3a, while FIG. 3b shows an Event Table that corresponds to those changes. The Event Table has fields that loosely correspond to the fields of the address book. Thus, for example, the "Event" column 340 of the address book, which identified objects undergoing a change, corresponds to the XQL path 310 to the node in the DOM at which the object that was the subject of the event is located; the "Change" column 350 of the address book describing the change corresponds to the "Nature of Event" field 320 (whether the event was a record addition or deletion, or a field modification) in the Event Table; and the "Time" column 360 describes the time the change was made to the address book, and corresponds to the "Time" field 330 in the Event Table. Although each instance of change in the database is recorded in the Event Table, specific data that is added, deleted, or substituted is not so recorded. Rather, once the Event Table has been processed and the number of events has been reduced to a minimum, the Change Manager will retrieve the relevant data values from the DOM to pass to the Sync Manager for transmission to the server. Each addition, deletion, or modification of data in the address book will cause a new record to be added to the event table until the synchronization process begins. Following synchronization, the data in the Event Table is cleared and new data will be added as further mutations are made to the local database.

When a new record is to be added to the local database, only such information as is needed to update the main database will be saved and transmitted. For example, in FIG. 3a, it will be seen that a new person, "Carol Roe" is being added to the address book 372. In order to minimize storage space on the client, Add the default method for adding a new record to the local database will not add either element or text nodes that are currently not being used. Therefore, neither element nor text nodes are added at event 372. A node that exists in the XML Document Type Definition (DTD), but not in the DOM tree, represents a null node value. Thus, when a new record is to be added to the address book, initially only a new "person" element is added. Thereafter, when a name 373, phone 342, or email 375 is added to the address book, the corresponding child element and text nodes will be added to the Event Table, 383, 384, and 385, and to the DOM.

The DOM of FIG. 7 depicts parent-child relationships between the nodes as a static, solid connecting line. However, the DOM structure is a "live" construction, meaning that it is constantly changing to reflect the contents of the XML document in real time as the document is modified. In FIG. 7, the DOM shows the address book as it exists in FIGS. 2a and 2b, before any of the changes shown in FIGS. 3a and 3b have been made. Each node has a name property, a data value property, and a type property. The type properties of the DOM describe the type of node. The Worldwide Web Consortium (W3C) has defined the basic element, text, attribute, and document node types. The name properties of the DOM in this example have been selected to be descriptive of the nodes. In FIG. 7, the DOM has a root node 410 of type "Document" having the name property ("address book"), but has no data value. Three "Element" type nodes 411-413 are situated immediately below the document node and have the name property "person". Each person "element" node has an attribute node of name "ID" and a value to uniquely distinguish it from every other person "element" node. Each person "element" node has three child "element" nodes, corresponding to the data in each of the database fields "name," "phone," and "email" for the relevant record. Text nodes 423 through 431 in FIG. 7 represent the data values for the parent "element" nodes.

In accordance with the DOM specification, nodes may be interfaced and manipulated with the methods that are applicable to each type of node. Although the DOM specification defines many such node types, the only nodes represented in FIG. 7 correspond to document, element, attribute, and text nodes. Returning to FIG. 1, changes made to the local database are implemented as changes to the XML document 100 representing the address book, and trigger events 120 that are detected by the Event Listener 110 and passed on to the Change Manager 130. The Change Manager creates and manages the Event Table 300 in which all events occurring after the most recent synchronization are listed. The address book shown in FIG. 3a and the Event Table shown in FIG. 3b each list eight events reflecting changes in the local database. Changes to the address book are identified at 370–377, while corresponding records entered into the Event Table are identified at 380–387. At 370 it may be seen that David Doe changed his phone number. That event is reflected in the Event Table as an XQL path identifying the "phone" node for the person having ID="2" 380 and a "change" of data. Next in the list, Sally Jones changed her e-mail address 371, which corresponds to event 381 in the Event Table. A new, null record 372 was added to the address book to create a record for Carol Roe, and is shown in the Event Table at 382. Carol's name 373, phone 374, and e-mail 375 are added in the address book, and correspond to events 383, 384 and 385 in the event table of FIG. 3b. Next, David Roe is removed from the address book 376, and this event is shown as a deletion 386 in FIG. 3b. Lastly, Carol Roe changed her phone number 377, and this modification is shown in the Event Table at 387. This is the last event before the changes will be processed, and the database on the server will be brought into synchronization with the modified data in the client address book.

The Change Manager determines which data must be passed to the server through a process of sorting and parsing the Event Table, and referring to the modified DOM to obtain the data related to each event in the Save Table. This process may follow any one of a number of methods for obtaining relevant data, and the steps outlined here are exemplary only, and do not represent the only means for obtaining such data. Regardless which method the Change Manager applies, however, it will produce the minimal change set needed to bring the server database into synchronization with that of the client.

In the embodiment depicted in FIGS. 2 and 3, the Change Manager will first sort, and then parse the Event Table to generate the minimal amount of data needed to send to the server. One method for doing this is to sort the Event Table by the XQL (structured query language for XML) path and timestamp. When sorted in alphabetical and timestamp order, the Sorted Event Table will place all events related to the same node consecutively in the table, and will place the earlier occurring events first. In this fashion, a node that has been added and later modified will appear in the table with the ADD event being above any subsequent MODIFY or DELETE events pertaining to the same node. A modified XQL is sorted alphabetically to group together all child nodes and branches, regardless of their location in the Event Table. FIG. 4 shows the address book example of FIG. 3b after it has been sorted alphabetically and by timestamp.

All events in the Event Table 300 begin with the XQL path prefix "//person[@ID=", such that the remainder of the XQL path will determine the listing order. As is shown in FIG. 4, person element nodes having an "ID" value of "2" are grouped together (380 with 386) followed by the sole person element node having an "ID" value of "3" (381). The largest grouping is of person element nodes having an "ID" of "4" (382, 383, 384, 385, and 387). Within each grouping, the shortest XQL path will have sorted to the top of the group, while progressively longer XQL paths will appear lower in the group listing. In order for the alphabetical sorting to work, the XQL path may be slightly modified by adding a special character to the beginning of the element name, which will cause the element to move to the bottom of the alphabetical list when sorted. After sorting, the shortest XQL path will correspond to the highest parent node of a branch, as with nodes at 382 and 386, and will appear at the top of a grouping in the table. Next will be individual elements that do not have child elements, such as nodes 383–385. Last will be nodes that have further child nodes, although none are depicted in the example of an address book. A deep node will have a long XQL path, but the path includes information about its parent nodes and will be sorted appropriately. After being sorted, the Event Table of FIG. 3b will have all of the events in order, as shown in FIG. 4. The Change Manager will then parse the list to determine which events should be entered in the Save Table.

Figure 5A:
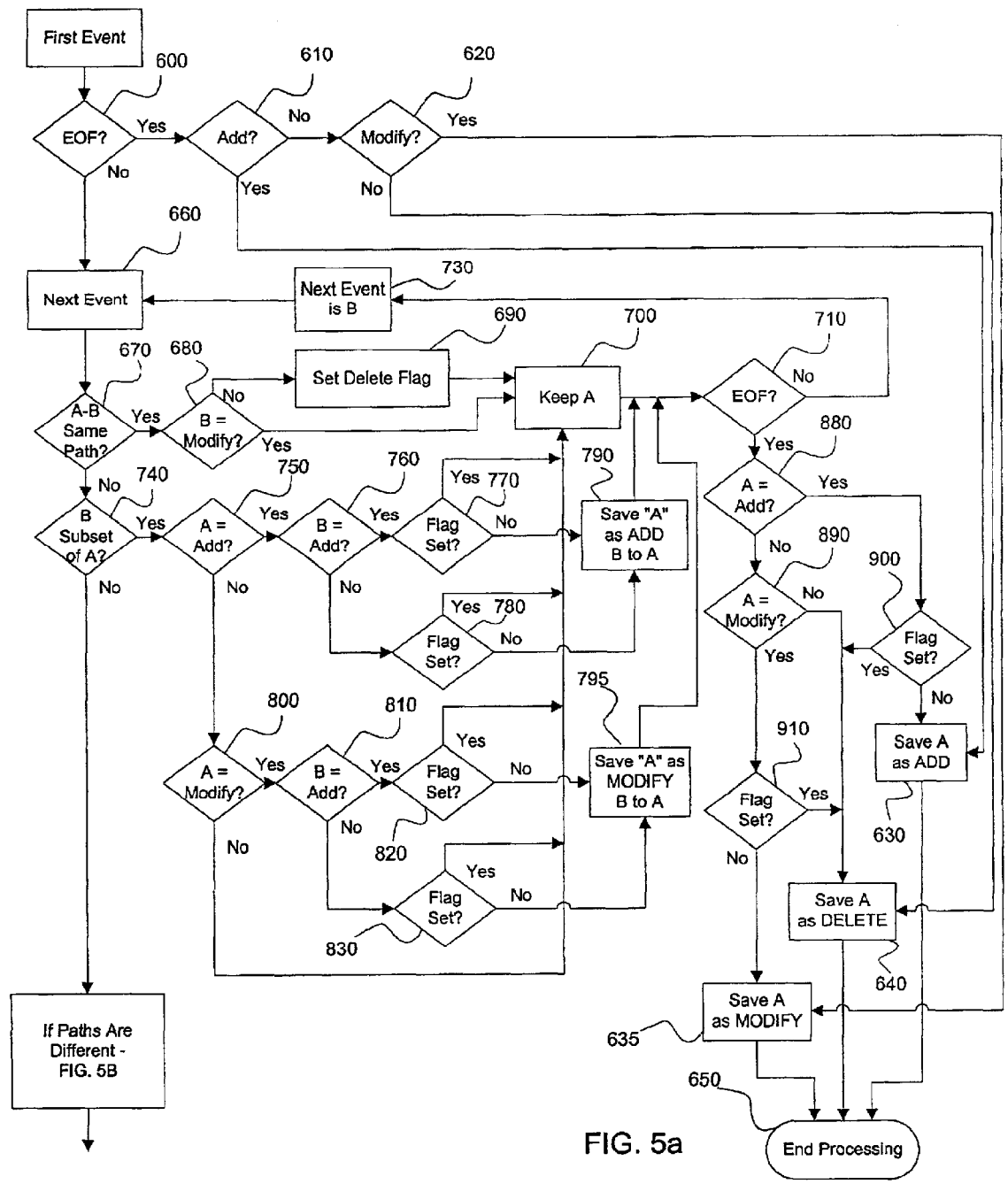
FIGS. 5a and 5b are connecting sections of a flow chart depicting one embodiment of the decision-making process that will reduce the number of events that will be sent to the main database.
Figure 5B:
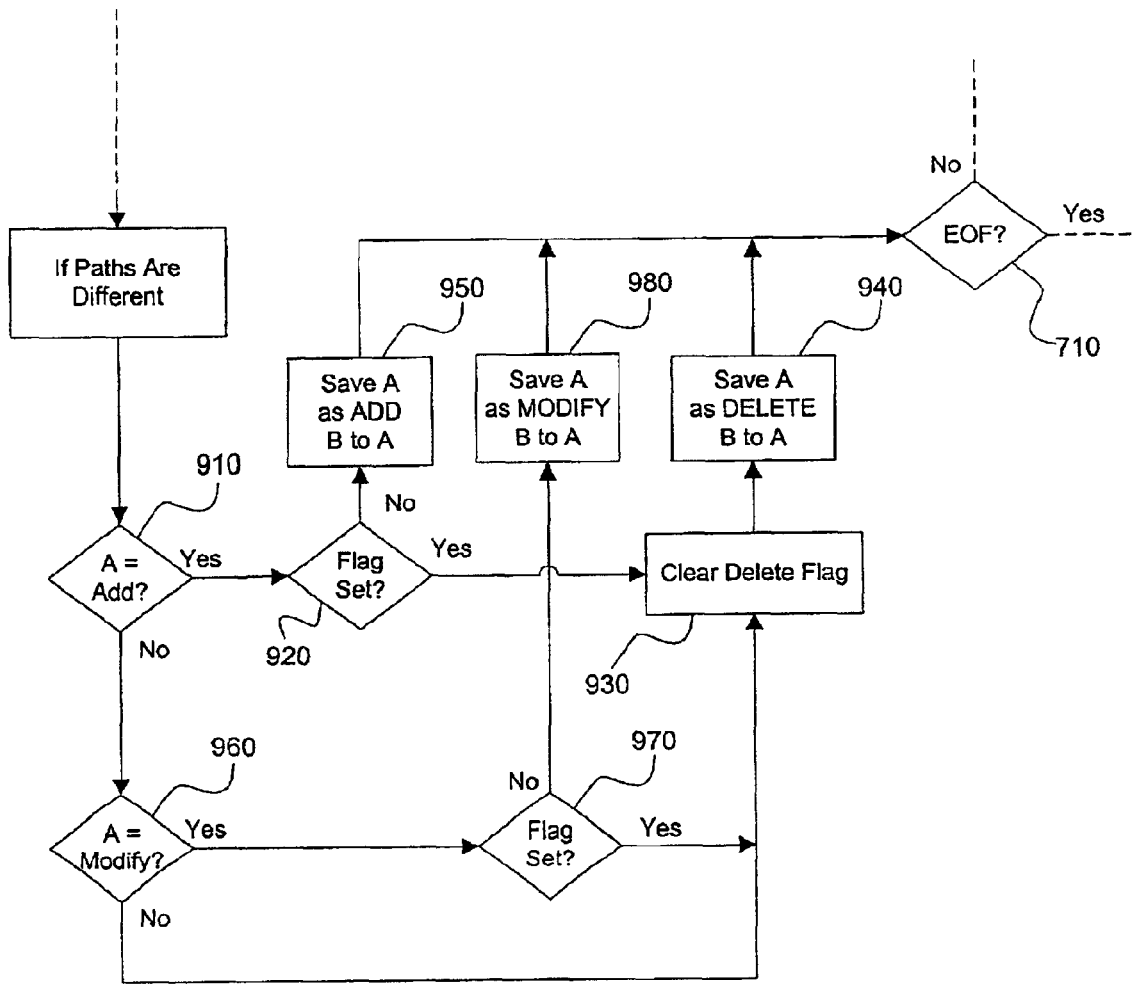

As depicted in FIGS. 5a and 5b, the Change Manager follows a set of rules to determine the minimal set of data to send to the server. Other embodiments may follow the same general steps and fall within the scope of this invention, yet differ in the specific manner in which they accomplish the steps. While other processing methods and steps may be used, one specific embodiment of the process is set forth in FIGS. 5a and 5b.

The general process for generating the Save Table involves a comparison of two events, denoted as Event A and Event B, which are designated as consecutive events in the sorted Event Table. Certain cases, however, require that save decisions be based upon the analysis of a single event, such as when the Event Table includes only a single event, or when there is but a single event remaining to be processed. The condition in which there is only one event in the Event Table will be detected at 600, where an End of File flag will cause processing to follow steps shown at 610-650. If the single event is an ADD 610, then that event will be entered in the Save Table 630 as an ADD, and processing will end 650. If the single event is a MODIFY 620, then that event will be entered in the Save Table 635 as a MODIFY, and processing will end 650. If the single event is a DELETE, then the event will be entered as a DELETE event 640, and processing will end 650.

Where the Event Table includes two or more events, processing will proceed to 660, where the next event (a B event) will be compared with event A. If A and B have the same path 670 then A can only be an ADD or a MODIFY, while B can only be a MODIFY or a DELETE. If B is a MODIFY 680, then A is kept and B is skipped or discarded 700. If B is a DELETE, then the "Delete Flag" (DF) is set to "True" 690, and A is kept while B is discarded 700. Next, the EOF flag 710 is checked and, if the end of file has been reached, the process for handling a sole remaining event will be followed, as is described below. If there is another event in the Event Table, a new event will be retrieved as a B event 730, and the comparison process will recommence 660.

If A and B do not have the same path 670, they will next be checked to see whether B is a subset of A 740, that is, whether B falls along a path that is a sub branch of the path upon which A is located. If B is a subset of A, the process next determines whether A is an ADD 750. If it is, the process determines whether B is also an ADD 760. If both A and B are ADDs, the process next determines whether the DF (delete flag) is True 770. If the DF is True (DF is set), then A is kept and B is discarded 700, and the process checks for another event 710. Alternatively, if the DF is False 770, then A is saved as an ADD and B becomes the next A 790, and the EOF 710 is checked.

If A is an ADD and B is not an ADD 760, then B must be a MODIFY. The reason that B is a MODIFY, and cannot be a DELETE is that a child "element" node representing a name, an e-mail, or a phone, cannot be deleted independently, but can be deleted only as part of the deletion of its parent "person" element node. While the deletion of the parent node is recorded as an event, the deletion of child nodes below the parent are not written as events in the Event Table. Having determined that B is a MODIFY 760, the process will next check the DF 780. If the DF is True (set), A is kept 700, B is discarded, and a next event is looked for 710. If the DF 780 is False (not set), then A is added to the Save Table as an ADD 790 and event B becomes event A for purposes of the next comparison.

A similar process is followed if B is a subset of A 740, and A is not an ADD 750, but is a MODIFY 800. If B is an ADD 810, then the DF flag is checked 820 and, if True, A is kept 700 and B is discarded. If the DF is False 820, then A will be saved as a MODIFY 795 and B will become the next A. If B is not an ADD 810, then it must be a MODIFY, and the DF is checked 830. If the DF is True 830, then A will be kept 700 and B will be discarded. If DF is False, then A will be saved as a MODIFY and B will become the next A 795.

If B is a subset of A 740, and A is not an ADD 750 or a MODIFY 800, then A must be a DELETE. Because of the manner in which the Event Table is sorted, it is possible that A may be a DELETE while B is an ADD or a MODIFY. Regardless whether B is an ADD or a MODIFY, the processing will result in A being kept 700, and B being discarded. This result flows from the fact that, if A is DELETED, any nodes below it in the same branch will necessarily also be deleted and will not require processing.

When all but the last event in the Event Table have been processed, an EOF flag 710 will signify that there are no other events to be retrieved. There will be a single remaining A event that must then be processed. If that event is an ADD and the DF is False 900, then it will be saved as an ADD 630. If the A is an ADD and the DF is True 900, then A will be saved as a DELETE. If A is not an ADD, it is then checked to see whether it is a MODIFY 890. If it is a MODIFY and the DF is False 910, then A will be saved as a MODIFY. If the DF is True 910, then A will be saved as a DELETE. If A is neither an ADD 880 nor a MODIFY 890, then it will be saved as a DELETE 640. Once the event has been saved, processing of the Save Table terminates 650 and the Synch Manager 140 will retrieve data values from the DOM corresponding to ADD and MODIFY events in the Save Table.

Turning next to FIG. 5b, processing of events is shown where the XQL paths for A and B are not within the same sub branch. In general, where the paths are different, the process will Save event A and will move event B to A and retrieve the next event as B. Because the B event represents a path that is different from that of A, the result of processing will leave the DF flag clear (False), will save the A event, and will move the B to the A event.

Thus, if A is an ADD 910, then DF 920 is checked and, if True, the DF flag is cleared (set to False) 930 and A is saved as a DELETE 940 and event B becomes event A. Processing then proceeds to check for an EOF condition 710, and further processing takes place as shown following EOF 710 in FIG. 5a. If DF 920 is False, A will be saved as an ADD 950 and event B becomes event A.

If A is a MODIFY 960, then DF 970 will be checked and if it is False, A will be saved as a MODIFY 980. If DF 970 is True, A will be saved as a DELETE 940. In either case, event B then becomes the next event A.

If A is not a MODIFY 960, then it must be a DELETE and A will be saved as a DELETE while B becomes the next A 940. The DF will be cleared 930, and processing will continue with a check for the EOF 710.

These decision rules shown in FIGS. 5a and 5b may be followed through the Sorted Event Table of FIG. 4 to result in the Save List shown in FIG. 6. The Change Manager will retrieve the first event [386], which is a DELETE event, will designate it as a A event, and will check to ensure that there is more than one event 600. The Change Manager will next retrieve 660 the B event [380], which is a A MODIFY event [380]. At step 670, the Change Manager determines that the a events do not have the same path 670. Proceeding to step 740, the Change Manager determines that B is a subset of A 740, then determines that A is not an ADD 750 or a MODIFY 800. The Change Manager then keeps (but does not yet save) A as a DELETE 700, discards B, and retrieves 660 the next B event [381].

B event [381] is a MODIFY that is not a subset of A. The Change Manager proceeds to determine that A is not an ADD 910 and is not a MODIFY 960. The Change Manager then clears the DF 930, saves A as a DELETE, and moves B to A 940. It then retrieves a new B event 660, which is an ADD event [382] that is not a subset of A. Proceeding to steps 910 and 960, the Change Manager determines that new event A [381] is a MODIFY 960. The DF is False 970, A is saved as a MODIFY and B becomes new event A 980.

The next B event [385] is an ADD that is determined to be a subset of event A [382] at step 740. Both A and B are ADDs 750 and 760, and the Change Manager next checks DF 770. Since DF 770 is clear, event A is saved as an ADD and event B moves to be new event A.

The next B event [383] is an ADD that is on a different sub branch from event A[385]. The Change Manager will process event A at steps 910 and 920, and will save event A as an ADD 950. Event B becomes new event A 950, and the next event in the Sorted Event Table [384] is retrieved. This, too, is an ADD that is on a different sub branch, and processing at steps 910 and 920 will cause event A to be saved as an ADD and event B to become new event A 950.

The change manager will then retrieve the last event [387] in the Sorted Event Table as a B event, and will determine that it has the same path as event A 670. Since A is an ADD and B is a MODIFY 680, A will be kept and B will be discarded 700. Upon checking EOF 710, the Change Manager will determine that no further events remain to be retrieved, and processing will continue at step 880. Since event A is an ADD, and the DF is not set 900, A will be saved as an ADD 630, and processing of the Sorted Event List will terminate 650. At that time, the Save List is complete and ready for transmission to the server.

FIG. 6 shows the Send List after it has been alphabetically sorted and then processed by the Change Manager. Comparing the list of FIG. 6 with that of FIG. 4, it may be seen that two changes made to the XML document need not be sent to the database on the server, and that the Send List represents the least amount of data that will synchronize the database on the server to that on the client device.

FIGS. 7 and 8, respectively, provide a depiction of the DOM before, and then after modifications were made to the address book. In FIG. 7, the DOM shows three elements 411, 412, and 413, each of which is identified by a tag ("ID") 520, 530, and 540, having a different value. Each of the three records has three data elements: Name, 414, 417, and 420; e-mail, 415, 418, and 421; and phone, 416, 419, and 422. The values of the data elements are shown, 423-431, and the DOM tree of FIG. 7 provides a complete picture of the address book.

In FIG. 8, modifications have been made to the address book, and the DOM, which is a "living" object that reflects changes as they are made in real time, has been modified to reflect those modifications. In FIG. 8, the element 412 having an "ID"="2" 520 has been deleted, as is symbolized by the dashed line separating that element from the DOM. Although an earlier modification was made to the telephone number for that element, the modification was later subsumed by the deletion of the entire record.

In addition, modifications made to the element having an "ID" of "3" are seen at 430, in a modification of the e-mail address for that element. Lastly, the addition of a new element 510 having an "ID" of "4" 550 is shown in the DOM of FIG. 8. The data values existing in the DOM at the time of synchronization will all be obtained at one time and sent to the server, along with the Save Table for inclusion in the database residing on that server.

A further aspect of the invention may require the server to send updated information from its database to the client's local database for processing. This could occur, for example, when a single master database receives updates from more than one source. The processes of this invention may be employed at the server to reduce the amount of data that must be transmitted before the transmission to the client is performed. Potential conflicts that may occur when the same record is updated from two remote sites prior to synchronization may be handled by methods and processes known in the art.

It will be understood that the invention is not limited to the processes shown and described, which are exemplary, and that other uses and configurations may be employed that will fall within the spirit and scope of the invention. For example, although the processing steps have been described with reference to an alphabetized and time sorted event list, an alternative embodiment would be to sort each group of identical XQL paths to place all DELETE events ahead of all ADD or MODIFY events in the list, thereby eliminating some of the steps required to process the sorted list. Similarly, other schemes for sorting the list or reducing the amount of data that must be transmitted to the server to a minimum may be employed, which may be considered to fall within the scope of this invention.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. In a system comprising a local processing device having a processor, a memory for maintaining a local document, a transmission link to a remote processing device, and a remote processing device having a processor and storage within which a remote document is maintained, a method for updating at least a portion of data elements of said remote document in accordance with mutations made to a local document comprising the steps of:

loading at least a portion of the structure of said remote document into a local processing device as an XML document;

creating a logical document object model (DOM) having a plurality of nodes arranged in a logical hierarchical structure such that each said node corresponds to an XML tag and data element in said XML document;

mutating said XML document by adding, deleting, or modifying one or more of said data elements;

updating said DOM to conform to said mutations to said XML document;

creating an entry in a first event table corresponding to each said mutation to said XML document, each said entry comprising at least a path to a node in said DOM affected by said mutation and an event type;

processing said first event table to create a second event table that will contain the smallest number of mutation events necessary to update said remote document such that, following the updating of said remote document, mutated data elements in said modified XML document will have corresponding data elements of the same value in said remote document;

transmitting said second event table and related data from said local device to said remote device; and mutating said remote document in accordance with events in said second event table and related data such that said remote document will have corresponding data elements of the same value as mutated data elements in said modified XML document.

2. The method for updating a remote document as claimed in claim 1 in which said step of processing said first event table to create a second event table comprises the further steps of:

creating a sorted event table by alphabetically sorting events in said first event table according to the XQL path of each said event, and secondarily sorting identical XQL paths by date and time, such that paths to identical nodes in the DOM will be listed with the first event in time being ahead of events later in time, and nodes on the same branch of said DOM will be grouped together such that shorter XQL paths will be listed ahead of longer XQL paths on the same branch, and nodes on a common XQL branch will be listed as a group;

processing events in said sorted event table in order by determining the type of event as being a delete event, an add event, or a modify event;

and if said event is a delete event, saving said delete event and its XQL path to said second event table as a delete event;

and, if said event is an add event, determining whether the node corresponding to said add event was thereafter the subject of a delete event, and if said node was thereafter the subject of a delete event, discarding said add event and saving said delete event and its XQL path to said second event table as a delete event, and if said node was not thereafter the subject of a delete event, saving said add event and its XQL path to said second event table as an add event;

and if said event is a modify event, determining whether the node corresponding to said modify event was thereafter the subject of a delete event, and if said node was thereafter the subject of a delete event, discarding said modify event and saving said delete event and its XQL path to said second event table as a delete event, and if said node was not thereafter the subject of a delete event, determining whether said node was the subject of an earlier add event or modify event, and if said node was the subject of an earlier add event or modify event, discarding said modify event, and if said node was not the subject of an earlier add event or modify event, saving said modify event to said second event table as a modify event.

3. The method for updating a remote document as claimed in claim 2 in which the step of transmitting said second event table and related data from said local device to said remote device comprises the further steps of:

retrieving from said DOM a data value related to each add or modify event in said second event table;

transmitting over said transmission link to said remote processing device the XQL path for each event in said second event table, the type of event and, for each said event that is an add or modify event, said data value related to said add or modify event.

4. The method for updating a remote document as claimed in claim 3 wherein said first processing device comprises a hand held device.

5. The method for updating a remote document as claimed in claim 3 wherein said first processing device comprises a cellular telephone.

6. The method for updating a remote document as claimed in claim 3 wherein said transmission link is a wireless communication link.

7. The method for updating remote document as claimed in claim 3 wherein said transmission link utilizes a medium having a maximum transmission rate of approximately 56 kbps.

8. The method for updating a remote document as claimed in claim 3 wherein said transmission link is conventional telephone lines.

9. The method for updating a remote document as claimed in claim 3 wherein said transmission link is a computer network.

10. A method for updating a remote document on a remote processing device from a local processing device comprising the steps of:

copying at least a relevant portion of said remote document onto said local processing device;

formatting said relevant portion of said remote document on said local device as an XML document;

creating a DOM corresponding to said XML document;

mutating to said XML document by adding, deleting, or modifying data elements in said XML document;

recording the type of each said mutation to said XML document in a first list together with information corresponding to the location in said DOM of said mutation;

processing said first list to determine the smallest number of mutations required to update said remote document such that, following said update, there is a data element in said remote document corresponding to each data element in said XML document;

creating a second list in which each entry corresponds to a mutation determined to be one of said smallest number of mutations required to update said remote document;

transmitting said second list and related data to said remote processing device such that said remote document may be updated in accordance with the entries in said second list.

11. The method for updating a remote document as claimed in claim 10 wherein said relevant portion of said remote document comprises the structure of said remote document.

12. The method for updating a remote document as claimed in claim 11 wherein said relevant portion of said remote document further comprises data elements.

13. The method for updating a remote document as claimed in claim 12 in which said step of processing said first list includes the further steps of:

sorting said first list to cause the entries in said first list to be placed in primary groups according to the location and path length of said data elements in a branch of said DOM, and secondary groups within said primary groups according to the date and time of each entry in said first list;

creating said second list be taking successive entries in said first list and determining whether each said entry represents a delete event, an add event, or a modify event;

and if said entry represents a delete event, saving said delete event and its XQL path to said second list and ignoring all other events related to nodes in the DOM located at or below the node related to said delete event;

and if said entry represents an add event occurring at a node that is not also the subject of a delete event, saving said add event and its XQL path to said second list and ignoring all other events related to nodes located at the same XQL path;

and if said entry represents a first modify event occurring at a node that is not also the subject of an add or delete event, saving said modify event and its XQL path to said second list and ignoring all other events located at the same XQL path;

and if said entry represents a modify event occurring at a node that has been the subject of an earlier delete, add, or modify event, discarding said modify event.

14. Apparatus for updating a remote document comprising:

a remote processing device comprising a remote machine readable storage for storing a remote document;

a local processing device connected to said remote device by a transmission link, said local device comprising a local machine readable storage having stored thereon a local document, said local document comprising at least a portion of said remote document;

said local machine readable storage maintaining said local document as an XML document, said XML document having XML tags, each XML tag corresponding to one of said data elements;

processor means for creating a DOM to be maintained in said local machine readable storage, said DOM having an interface with said XML document such that each said XML tag corresponds to a node in said DOM and each said node has the same value as the data element corresponding to said XML tag;

processor means for updating said DOM to correspond to mutations made to said XML document such that additions, deletions or modifications to said data elements in said XML document cause corresponding additions, deletions or modifications to nodes of said DOM;

a keypad for entering mutations to said XML document;

storage means for recording said mutations as events in an event table, such that each event in said event table comprises a path to the node of said DOM corresponding to said event and an identifier of said event as an addition, deletion, or modification;

processor means for parsing said event table to create a second event list comprising the smallest number of events that will update said remote database;

a transmission link to said remote device;

remote processor means for updating said remote database in accordance with events contained in said second event list.

15. The apparatus of claim 14 in which said transmission link comprises sending and receiving antennae communicating through a wireless link.

16. The apparatus of claim 14 in which said transmission link comprises a telephone line.

17. The apparatus of claim 14 in which said transmission link comprises a narrow band communications medium.

18. The apparatus of claim 14 in which said transmission link comprises a computer network.

19. The apparatus of claim 14 in which said local processing device comprises a hand held electronic device.

20. The apparatus of claim 14 in which said local processing device comprises a cellular telephone.

21. The apparatus of claim 14 in which said local processing device comprises a computer.

* * * * *